Figure 1:
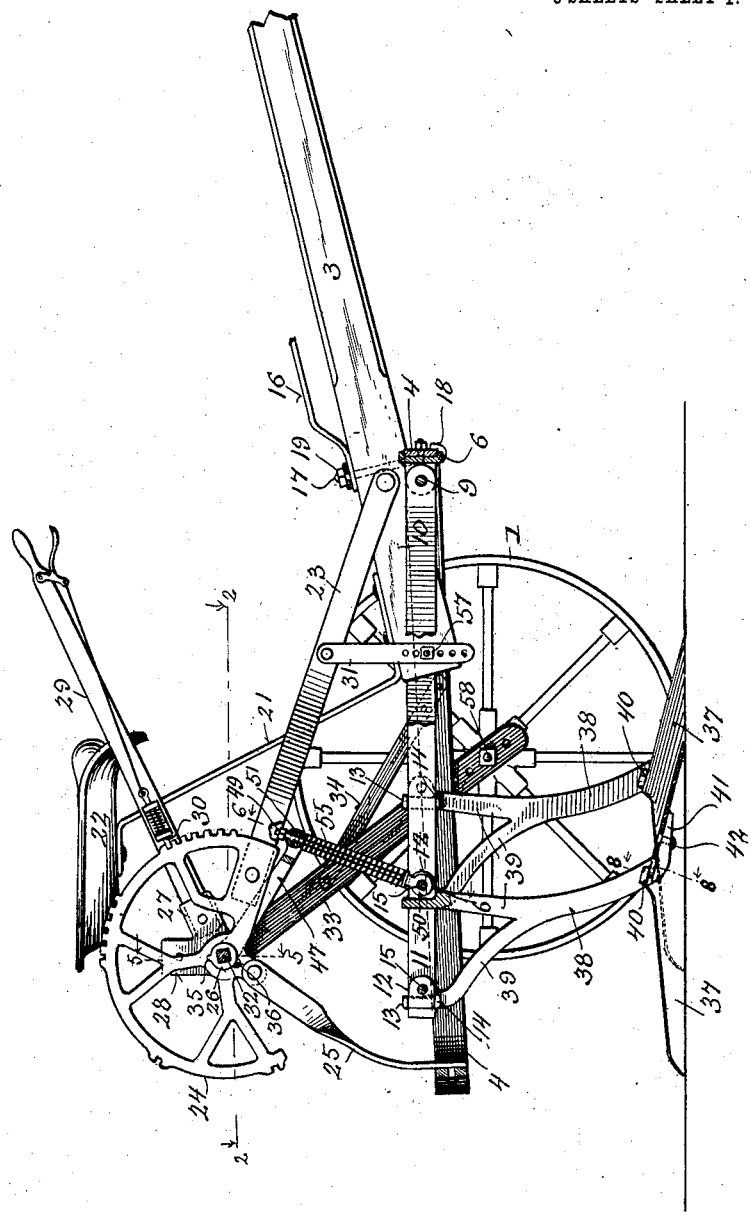

No. 791,145. PATENTED MAY 30, 1905.
W. GATERMAN.
WEED DESTROYER.
APPLICATION FILED FEB. 17, 1904.

3 SHEETS—SHEET 1.

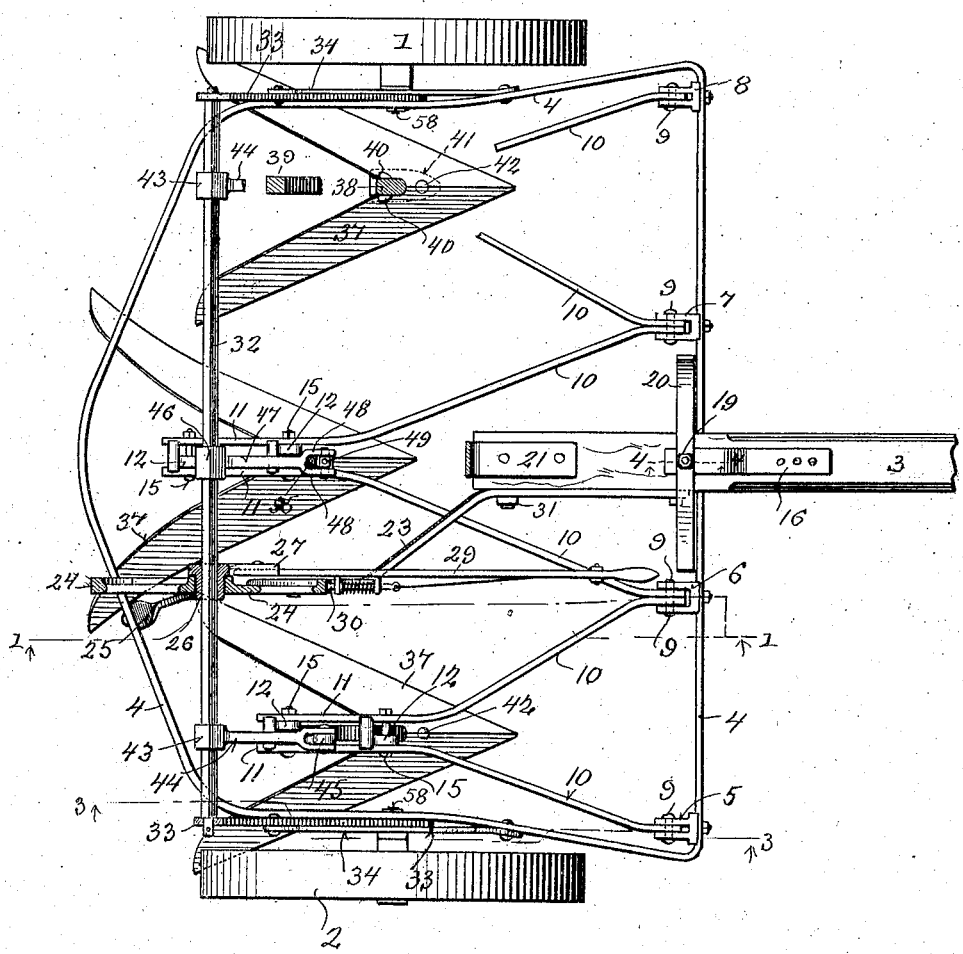

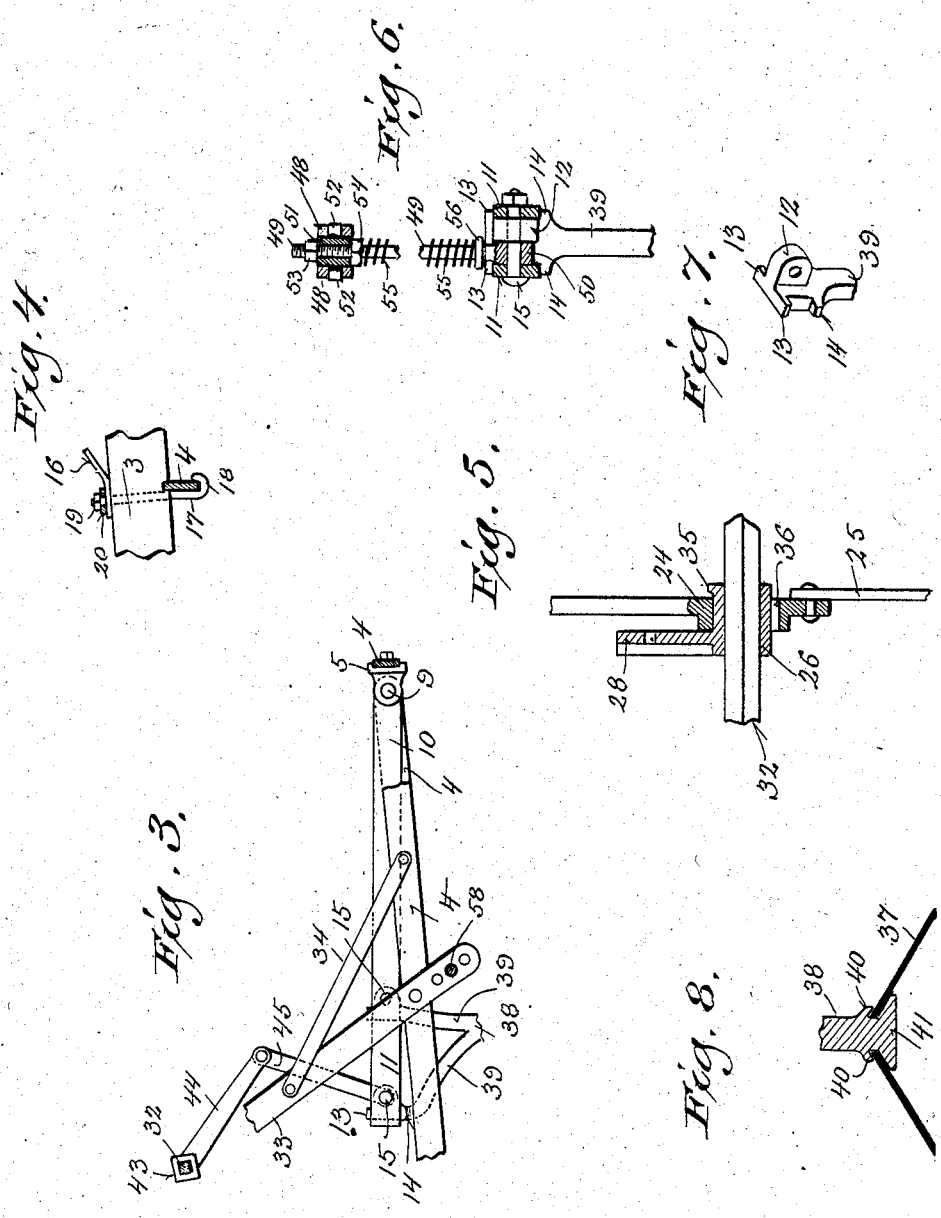

No. 791,145.

Patented May 30, 1905.

UNITED STATES PATENT OFFICE.

WILLIAM GATERMAN, OF MANITOWOC, WISCONSIN.

WEED-DESTROYER.

SPECIFICATION forming part of Letters Patent No. 791,145, dated May 30, 1905.

Application filed February 17, 1904. Serial No. 193,946.

*To all whom it may concern:*

Be it known that I, WILLIAM GATERMAN, a citizen of the United States, and a resident of Manitowoc, in the county of Manitowoc and State of Wisconsin, have invented certain new and useful Improvements in Weed-Destroyers; and I do hereby declare that the following is a full, clear, and exact description thereof.

My invention is particularly designed for the destruction of thistles and other noxious weeds; and it consists in certain peculiarities of construction and combination of parts, as will be fully set forth hereinafter, in connection with the accompanying drawings, and subsequently claimed.

In the said drawings, Figure 1 is a view in side elevation of my device, partially broken away and partly in section on the line 1 1 of Fig. 2. Fig. 2 is a plan view, partly in section, on the line 2 2 of Fig. 1. Fig. 3 is a detail of a portion of the frame, partly in section, on the line 3 3 of Fig. 2. Fig. 4 is a detail of a clamping-bolt and adjacent parts. Figs. 5 and 6 are detail views, partly in section, on the lines 5 5 and 6 6 of Fig. 1. Fig. 7 is a detail perspective view of the head of one of the branches of the shovel-leg. Fig. 8 is a detail view on the line 8 8 of Fig. 1.

Referring by numerals to the drawings, 1 2 represent the wheels of my device, and 3 the tongue.

4 designates a metal band extending continuously from the tongue to and around the rear of the machine inside of the wheels.

5, 6, 7, and 8 designate forked brackets bolted to the front transverse stretch of the band 4, to which brackets are pivotally connected by bolts 9 the front ends of the bent arms 10 10, (six in number,) which arms are arranged in pairs extending backward, the two arms in each pair converging toward each other and then the rear ends of said arms being parallel, as shown at 11 11.

16 represents an angle-plate rising above the tongue 3 for the attachment of a whiffletree, the rear end of said plate 16 being secured to said tongue by a bolt 17 passing through a bore in said tongue and the lower end of this bolt being bent into a hook 18, which supports the front stretch of the band 4 (which may be recessed at this point to prevent slipping) and holds same up against the under side of the tongue, when the screw-threaded upper end of said clamping-bolt 17 is secured by a nut 19. A transverse foot-rest 20 is centrally perforated and slipped on said bolt 17 between the plate 16 and the said nut 19 and the latter tightened down to secure all of the said parts together.

21 indicates a seat-support secured to the rear end of the tongue 3 and rising upward and backward therefrom, and 22 is a seat secured to the upper end of said support.

Extending back from the tongue 3 in an upward oblique direction is a bent bar 23, having its rear end secured to a segment 24, whose periphery is formed with sockets at intervals, the said segment being also connected to another supporting-bar 25, whose other end is fastened to the rear stretch of the band 4. The said segment is formed with an axial opening in which is fitted a cylindrical hub 26, having projecting socket-plates 27 28 for the reception of the lower end of a hand-lever 29, having a spring-latch 30 for engagement with one or another of the sockets on the periphery of the segment 24. The bar 23 is strengthened and supported by a brace 31, connected to it and adjustably connected to the tongue 3.

32 designates a transverse shaft, preferably square in cross-section, which passes through a correspondingly-shaped bore in the segment-hub 26, the ends of this shaft being reduced and made cylindrical and slipped within round holes in the upper ends of inclined bars 33 33, to whose lower ends the hubs of the wheels 1 2 are fastened, there being braces 34 34 connected to said bars 33 and to the side stretches of the band 4, the parts 31, 33, and 34 being all provided with series of bolt-holes, so as to render said parts adjustable, as required. The hub 26 is formed with a retaining-lug 35, and when slipping said hub to place within the axial opening in the segment 24 the said hub is turned so that this lug may pass through an enlargement or communicating recess 36 of said axial opening and then turned to bring said hub into the position shown in Figs. 1 and 5, with the said lug serving to retain the hub in position. The transverse shaft 32 may be turned to the position desired by the hand-lever 29 and locked in said adjusted position by the engagement of the spring-latch 30 in the then adjacent socket in the segment 24, this movement serving to vary the height from the ground of the hereinafter-described shovels, whose legs are attached to the hereinbefore-named bent arms 10, as presently described.

The shovels just referred to (numbered 37 37 37) are each composed of two blades meeting at the front and thence diverging backwardly and set at an angle to each other, as indicated in Fig. 8, with front and outer cutting edges at the base-line, and are secured to the lower end of the legs 38 38 38, each shovel having an opening back of its apex to receive the said leg, as indicated by the sectional view of the leg 38, fitting in this opening of the shovel in Fig. 2. The said legs 38 have inclined projections 40 40 and feet 41, having similarly-inclined edges, and between these parts are received the inner upper edges of the shovels, as shown in Fig. 8, the said feet 41 projecting forwardly and extending under the front part of said shovels and being secured thereto by bolts 42, as best shown in Fig. 1. The upper ends of these legs 38 are forked, as shown at 39 39, each branch of the said upper forked ends terminating in a peculiar shaped head. (Shown in detail in Fig. 7.) The heads of the two branches of each leg are just alike, save that the perforated lugs 12 are placed on one branch near to one edge of the head and on the other branch of the same leg near the other edge of its head, and each head has upper and lower lugs 13 14 on each edge, forming recesses between them for the reception of the parallel ends 11 of the bent arms 10, to which the said heads of the leg branches 39 are secured by bolts 15, whereby the said heads are secured between the said parallel arm ends 11, the lug 12 of one branch head being against the inner side of one of said ends 11 and the lug 12 of the other branch head being against the inner side of the parallel end 11, as best shown in Fig. 2.

Sleeves 43, having polygonal bores, are slipped on the polygonal transverse shaft 32, (one sleeve 43 near each end thereof,) said sleeves having levers 44 integral or rigid therewith, and these levers are preferably forked at their forward ends and there pivotally united to the links 45, whose lower ends are pivoted, as shown in Fig. 3, on one of the bolts 15, which connect the parallel arm ends 11 to support the foremost shovels next the wheels of the machine. The central shovel extends back farther than the others, and this is somewhat differently connected to the shaft 32, which shaft extends through a polygonal bore in the central sleeve 46. This sleeve carries a forked lever 47, similar to the levers 44 just described, (the two branches of the forked end being numbered 48 48;) but in place of a link like the link 45 of the outer shovel connections there is a rod 49, whose lower end 50 is pivoted on one of the said bolts 15 next the adjacent lug 12, and said rod 49 extends up through a central bore in the ball 51, which is swiveled by its trunnions 52 52 in the forked ends 48 48 of the lever 47, the upper end of this rod 49 being screw-threaded to receive a nut 53, all as best shown in Fig. 6, in which view is also shown another nut, 54, to be applied to the rod 49 below the ball 51 when it is desired to make the action of this rod 49 the same as the hereinbefore-named links 45. Usually, however, this nut 54 is not used, and there is a spiral spring 55 surrounding the rod 49 between a lower collar 56 thereon and the under side of the ball 51, the absence of the nut 54 permitting the upward movement of the rod 49 through said ball 51, this being desirable in stony land.

The operation of my device will be readily understood from the foregoing description of its construction, taken in connection with the accompanying drawings. By the described arrangement of the three shovels 37—two in line adjacent to the wheels and a third shovel in the center but back of the other two and with its cutting-blades overlapping the line of the inner blades of the shovels—all parts of the ground between the wheels will be cultivated and the sharp edges of said blades will cut the weeds off from their roots at any desired depth below the surface of the ground, this being regulated by the hand-lever 29, as described, whereby all of the shovels can be raised or lowered simultaneously. To tilt the shovels so as to vary the inclination of their pointed ends, the bolt 57, which connects the brace 31 to the tongue 3, is removed and the said brace raised or lowered to bring another hole in the brace in line with the hole through the tongue and the bolt 57 again inserted, and similarly the normal height of the device above the ground may be varied by like adjustment of the bolt 58 in the holes in the lower ends of the inclined bars 33.

In the preferred construction of my device, as best shown in Fig. 2, the hereinbefore-named middle shovel 37, which projects back of the line of the two other shovels, is also shown as having the rear ends of its blades curved outwardly at the points where said blades are directly back of the inner blades of the said other shovels, thereby insuring the overlapping referred to, whereby any roots that have slipped past the forward shovels or been merely pushed aside thereby will be certain to be cut by the said curved ends of the rear shovel.

Having thus described my invention, what I claim as new, and desire to secure by Letters Patent, is—

1. In a weed-destroyer, the combination with a wheeled supporting-frame of a series of rearward-extending arms, a series of legs secured to said arms, and having inclined lateral projections and adjacent forward projecting feet with inclined upper edges; a series of shovels, each having a pair of angularly-set cutting-blades meeting in a point at front and diverging backward, and the inner upper edges of said blades being received between the projections and feet of said legs; and bolts uniting the said feet and shovels.

2. In a weed-destroyer, the combination with a wheeled supporting-frame of a series of pivoted rearward-extending arms; a series of legs secured to said arms; shovels attached to said legs; a tongue secured to said frame; a segment connected to said tongue and frame; a transverse shaft linked to said arms and revolubly supported in an axial opening in said segment; a hand-lever for moving said shaft, and a spring-latch carried by said lever for locking engagement with said segment.

3. In a weed-destroyer, the combination with a wheeled supporting-frame, of a series of depending legs suspended therefrom, said legs having inclined lateral projections and adjacent forward projecting feet with inclined upper edges, and a series of shovels, each having a pair of angularly-set cutting-blades meeting at a point in front and diverging backward, with a leg opening back of the front meeting ends, the said leg being received therein, and the inner upper edges of said blades being received between the projections and feet of said legs, and the said feet extending under the pointed front ends of the shovels and being bolted thereto.

In testimony that I claim the foregoing I have hereunto set my hand, at Milwaukee, in the county of Milwaukee and State of Wisconsin, in the presence of two witnesses.

WILLIAM GATERMAN.

Witnesses:
H. G. UNDERWOOD,
R. J. BARSCH.